(12) United States Patent
Capriotti

(10) Patent No.: US 11,015,754 B2
(45) Date of Patent: May 25, 2021

(54) ADJUSTABLE START COLLAR

(71) Applicant: Chris Capriotti, Clovis, CA (US)

(72) Inventor: Chris Capriotti, Clovis, CA (US)

( * ) Notice: Subject to any disclaimer, the term of this patent is extended or adjusted under 35 U.S.C. 154(b) by 148 days.

(21) Appl. No.: 16/528,303

(22) Filed: Jul. 31, 2019

(65) Prior Publication Data

US 2021/0033236 A1 Feb. 4, 2021

(51) Int. Cl.
| | | |
|---|---|---|
| *F16L 41/12* | (2006.01) | |
| *F16L 13/02* | (2006.01) | |
| *F16L 25/14* | (2006.01) | |
| *B60H 1/00* | (2006.01) | |
| *F16L 43/00* | (2006.01) | |
| *F24F 13/02* | (2006.01) | |
| *F16L 25/00* | (2006.01) | |

(52) U.S. Cl.
CPC .......... *F16L 41/12* (2013.01); *B60H 1/00564* (2013.01); *F16L 25/0045* (2013.01); *F16L 25/14* (2013.01); *F16L 43/002* (2013.01); *F24F 13/0209* (2013.01)

(58) Field of Classification Search
CPC ....... F16L 25/0045; F16L 25/14; F16L 41/08; F16L 41/12; F16L 43/002; F24F 13/0209; B60H 1/00564
See application file for complete search history.

(56) References Cited

U.S. PATENT DOCUMENTS

| | | |
|---|---|---|
| 73,867 A | 1/1868 | Green |
| 216,991 A | 7/1879 | Abbott |
| 369,211 A | 8/1887 | Smith |
| 414,200 A | 11/1889 | Elliott |
| 514,857 A | 2/1894 | Laube |
| 672,548 A | 4/1901 | Durall |
| 864,034 A | 8/1907 | Rudderow |
| 1,815,858 A | 8/1931 | McAlees |
| 2,431,172 A | 11/1947 | Harrison |
| 2,880,017 A | 3/1959 | Anderson et al. |
| 3,290,066 A | 12/1966 | Primich et al. |
| 3,543,570 A | 12/1970 | Stone |
| 3,915,477 A | 10/1975 | Timmons |
| 4,416,474 A | 11/1983 | Miller et al. |
| 4,418,943 A | 12/1983 | Ionna |
| 4,569,110 A * | 2/1986 | Goettel ................. F16L 37/008 126/153 |
| 4,890,864 A * | 1/1990 | Anderson ............... F16L 45/00 285/125.1 |
| 5,133,579 A | 7/1992 | Anderson et al. |
| 5,240,292 A | 8/1993 | Roszin |

(Continued)

*Primary Examiner* — Ryan A Reis

(57) ABSTRACT

An adjustable duct start collar may include a base with a flange on a first end of the base and a plurality of tabs on a second end of the base. The base may be constructed of a material of substantially uniform thickness and include at least two slots in the base. The first of the slots may be positioned substantially parallel to a second of the at least two slots. Each of the slots of the at least two slots being able to independently receive the flange, whereby when the base is curved into a cylindrical shape with the flange positioned in the first of at least two slots, the curved base will form a cylindrical shape with a first diameter and when the flange is positioned in the second of the at least two slots, the curved base will form a cylindrical shape with a second diameter.

12 Claims, 5 Drawing Sheets

(56) References Cited

U.S. PATENT DOCUMENTS

| | | | | |
|---|---|---|---|---|
| 5,393,106 A * | 2/1995 | Schroeder | ............ | F16L 41/082 |
| | | | | 285/136.1 |
| 6,244,633 B1 * | 6/2001 | Warren | ................ | F16L 37/008 |
| | | | | 285/141.1 |
| 8,540,287 B2 | 9/2013 | Williams | | |
| 8,936,280 B2 | 1/2015 | Williams | | |
| 9,291,290 B2 * | 3/2016 | Prischak | .................. | F16L 9/17 |

* cited by examiner

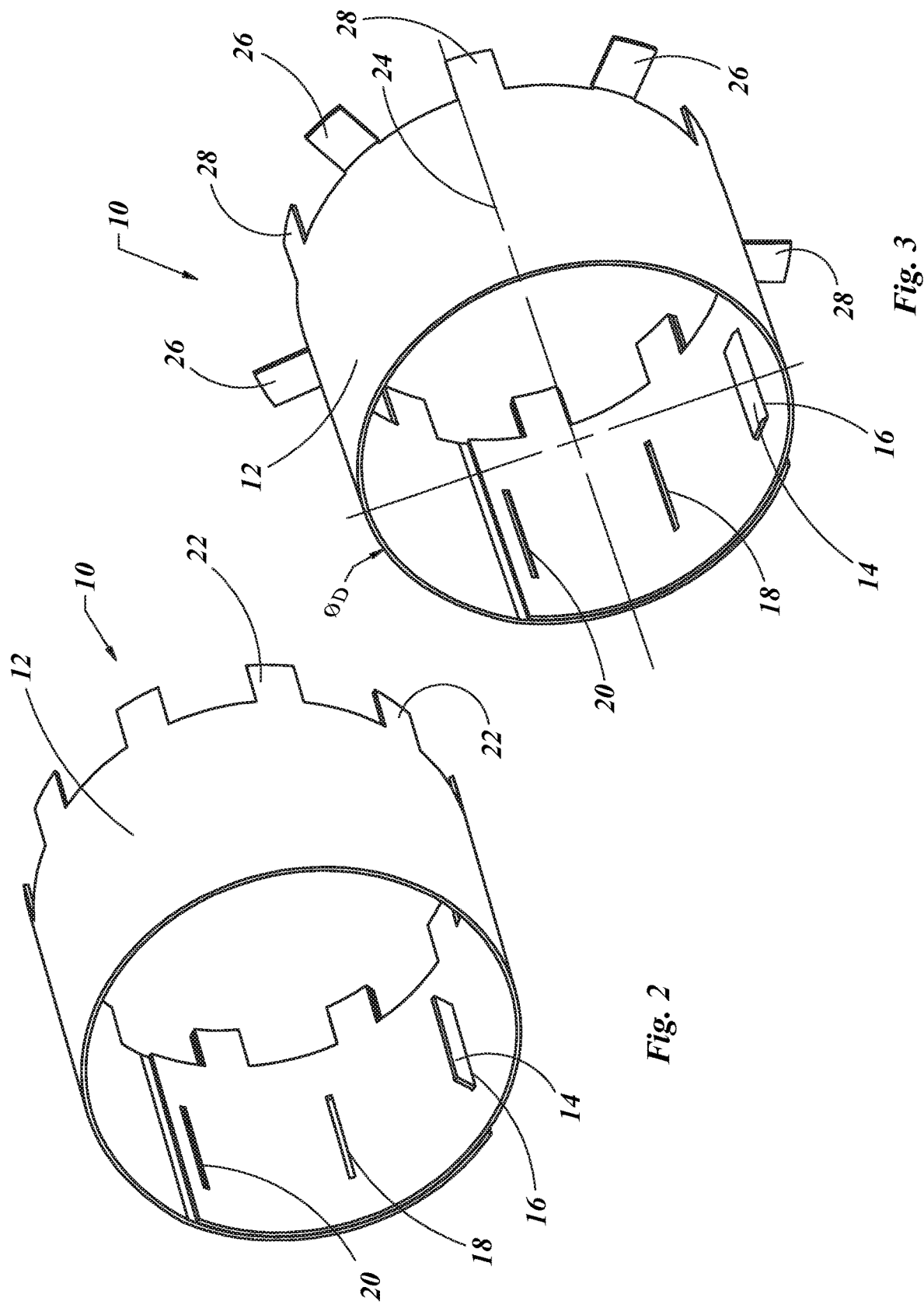

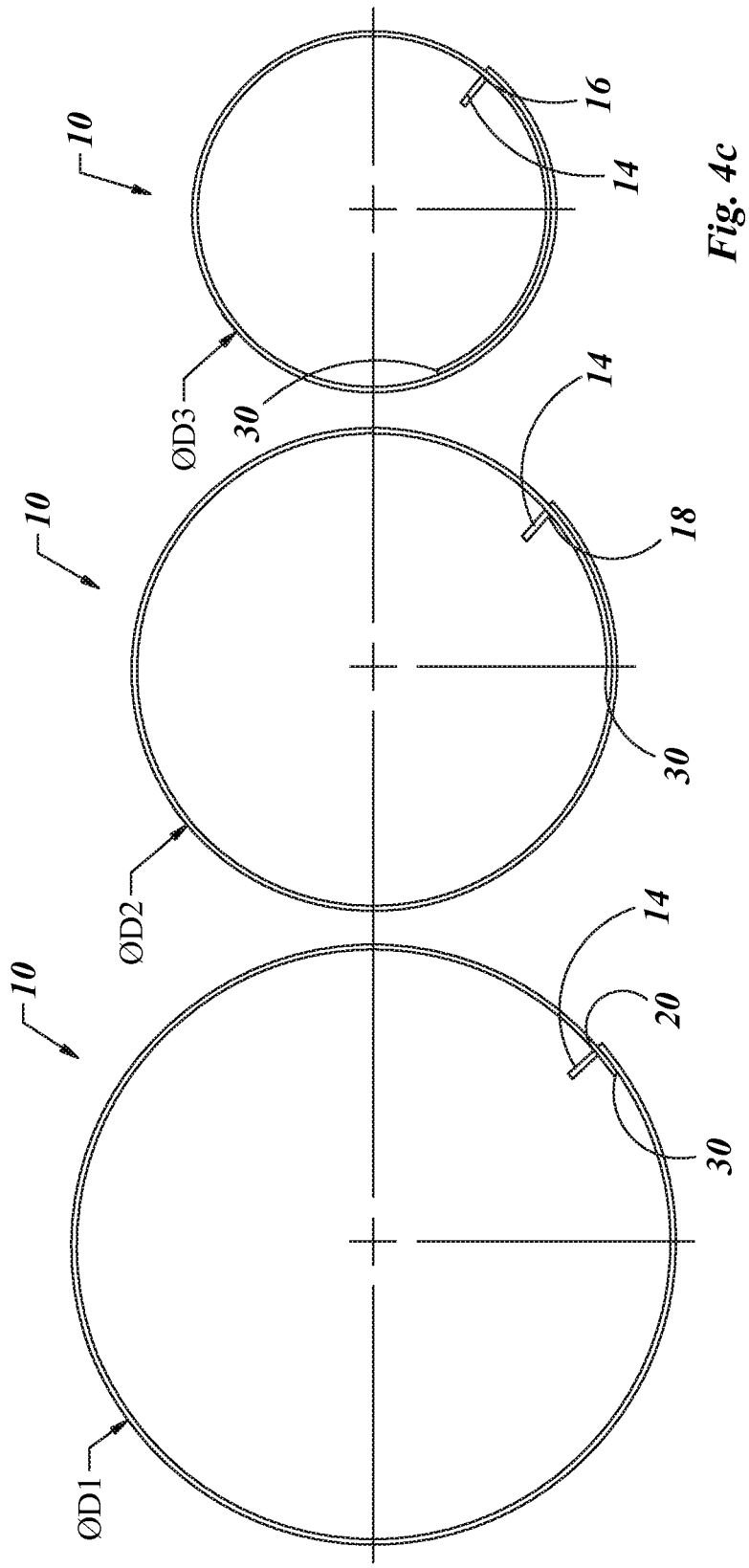

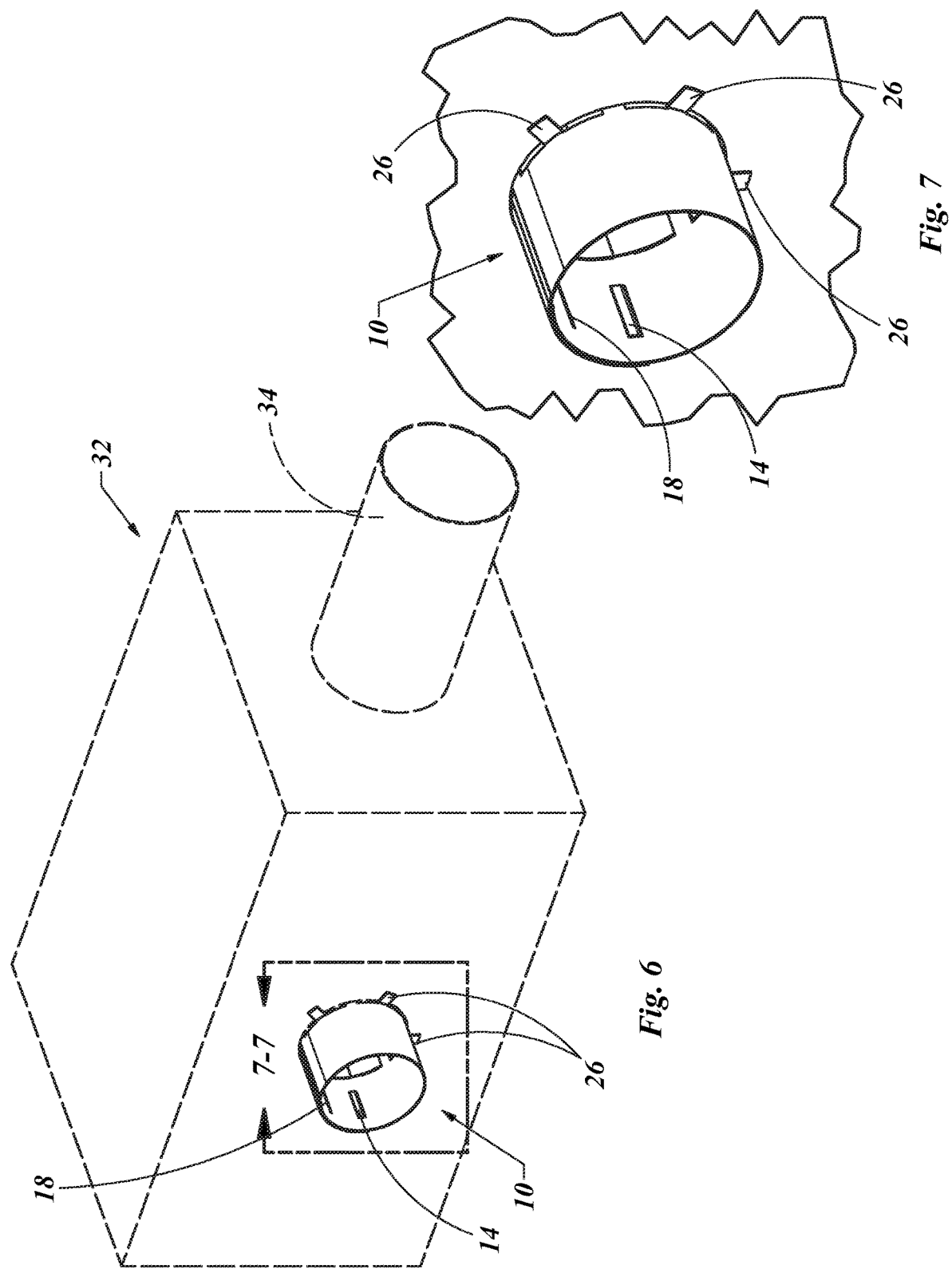

ADJUSTABLE START COLLAR

FIELD OF THE INVENTION

The present invention generally relates to heating, ventilation and air conditioning (HVAC) ductwork, and more particularly, to start collars that are used to start a duct from a plenum distribution box.

BACKGROUND OF THE INVENTION

Virtually all houses and buildings in the civilized world now have heating, ventilation and air conditioning. As there are few physical structures that are identical, virtually every ductwork instillation must be custom made to fit the needs of that particular building. This means a great deal of modification of common parts may be needed to be performed by the HVAC installer or the installer must carry a great deal of "just in case" parts to every jobsite. Every economic venture has a common theme, the more it costs the provider of the product or service, the more it will cost the customer. If commonly used parts may be quickly and easily modified to then be used in a variety of different individual specifications, this saves the installer money in not carrying extra parts that may not be used. As well, with one adjustable part, the installer may save trips from the top of the building to the truck or from the jobsite to the supplier to get the correct part.

The installer must take a large duct and snake it through a crawlspace to provide an output to each room in a dwelling. As the ductwork moves farther from the source and closer to the termination of that air duct line, the airflow need may be reduced and therefore so may be the diameter of the ductwork. Therefore, a duct near the furnace may need to be twelve inches or larger in diameter to provide enough airflow to the farthest reaches of the dwelling. At the end of that path of ductwork, the termination of that air duct line may be a six inch or smaller duct that ends at a single vent. Between the origin of the duct and the termination of the duct, there may be multiple plenum distribution boxes. These plenum distribution boxes may be rectangular boxes where one or more duct lines may split off to form individual air duct lines. A start collar may be used to start an air duct line from each plenum distribution box. The airflow needs for each air duct line may vary, so the diameter of the start collar may vary. The amount of airflow need in that individual air duct line may vary with the area of the room it services as well as how many rooms to which that air duct line will provide airflow. This is the job of the installer to properly size each air duct line in accordance with the building requirements.

It should, therefore, be appreciated that there is a need for an adjustable start collar. This simplicity in manufacturing may allow a single device to be produced which may be modified to more than one diameter in a few seconds. The present invention fulfills this need and others.

SUMMARY OF THE INVENTION

The present invention may include an adjustable duct start collar including a base with a flange on a first end of the base and a plurality of tabs on a second end of the base. The base may be constructed of a material of substantially uniform thickness and include at least two slots in the base. The first of the at least two slots may be positioned substantially parallel to a second of the at least two slots. Each of the slots of the at least two slots being able to independently receive the flange, whereby when the base is curved into a cylindrical shape with the flange positioned in the first of at least two slots, the curved base will form a cylindrical shape with a first diameter and when the flange is positioned in the second of the at least two slots, the curved base will form a cylindrical shape with a second diameter.

The adjustable start collar may also include the first end of the base being adjacent to the second end of the base. Furthermore, the at least one of the plurality of tabs may be folded to be substantially parallel to the second end of the base. At least two of the plurality of tabs may be folded away from a central axis of the cylindrical shape of the curved base, whereby an outer surface of the at least two of the plurality of tabs may form a support surface. The support surface may support the adjustable start collar onto a piece of ductwork. At least two of the plurality of tabs may remain substantially uniform with the curved base, thereby creating insert tabs, wherein the insert tabs may support the adjustable start collar positioned in a hole placed in a piece of ductwork.

The adjustable start collar may be manufactured from a pliable material such as galvanized sheet metal between 0.012 and 0.018 inches thick. A dimension of each of the at least two slots may be between 0.005 and 0.120 inches greater than the dimension of the substantially uniform thickness of the base. The flange may be folded perpendicular to the base when the base is substantially flat. The flange may be folded back toward the base after being inserted into one of the at least two slots after the base is curved into a cylindrical shape.

For purposes of summarizing the invention and the advantages achieved over the prior art, certain advantages of the invention have been described herein. Of course, it is to be understood that not necessarily all such advantages can be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following description of the preferred embodiments and drawings, the invention not being limited to any particular preferred embodiment(s) disclosed.

BRIEF DESCRIPTION OF THE DRAWINGS

Embodiments of the present invention will now be described, by way of example only, with reference to the following drawings, in which:

FIG. 2 is an isometric view of the adjustable start collar shown in FIG. 1, with the flange inserted into a first slot.

FIG. 3 is an isometric view of the adjustable start collar of FIG. 2, with the flange folded down toward the base and some of the tabs folded away from the central axis.

FIG. 4a shows an end view of an adjustable start collar with the flange in a third slot, thus providing a larger diameter of the start collar.

FIG. 4b shows an end view of an adjustable start collar with the flange in a second slot, thus providing a medium sized diameter of the start collar.

FIG. 4c shows an end view of an adjustable start collar with the flange in a first slot, thus providing a smaller diameter of the start collar.

FIG. 6 is an isometric view of the plenum distribution box of FIG. 5, with the adjustable start collar installed into the wall of the plenum distribution box.

FIG. 7 is an isometric detailed view of the adjustable start collar positioned in the wall of the plenum distribution box of FIG. 6 and marked by cutline 7-7.

DETAILED DESCRIPTION OF THE INVENTION

Figure 1:
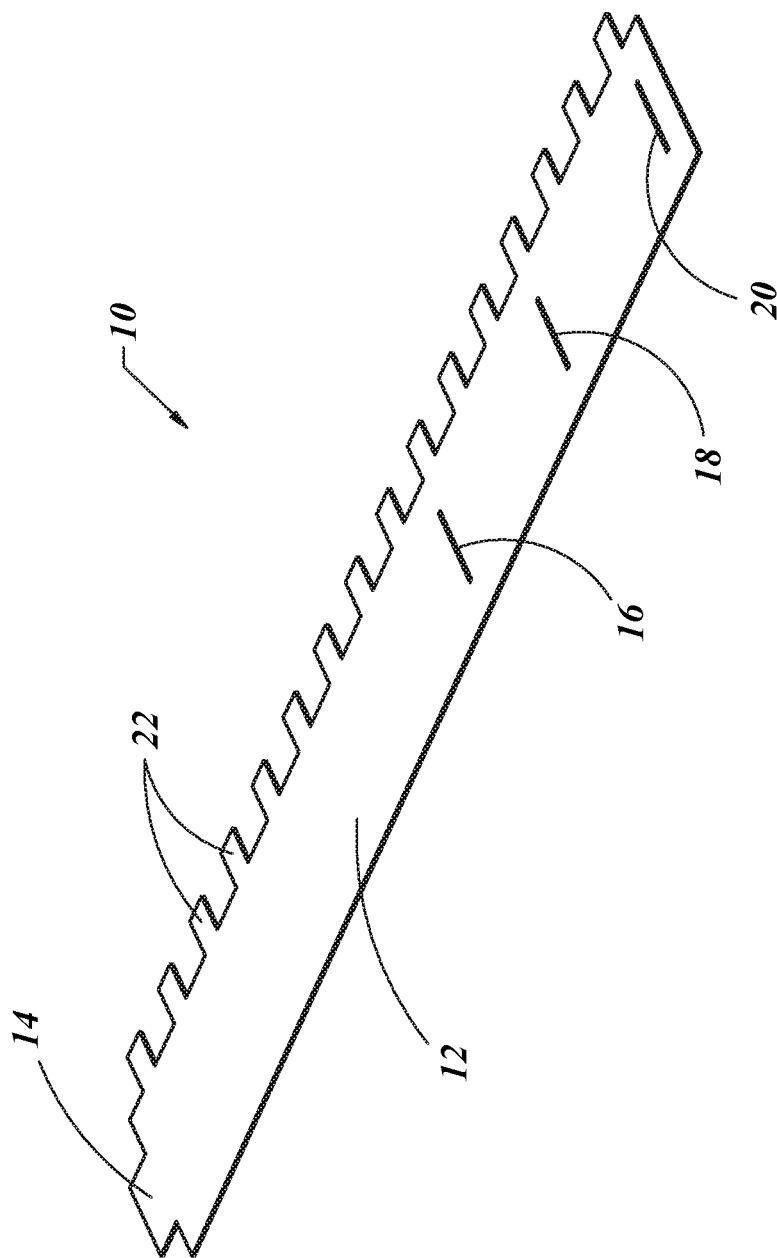
FIG. 1 is an isometric view of an adjustable start collar in a flat orientation, the start collar presented in accordance with the present invention.

With reference to the illustrative drawings, and particularly to FIG. 1 and FIG. 2, there is shown an adjustable start collar 10. In FIG. 1 the adjustable start collar 10 is in a flat pattern, as it may be after being stamped or cut from a sheet of metal. In FIG. 2, the same adjustable start collar 10 is shown rolled into a cylindrical shape. In both variants of the shape of the adjustable start collar 10, a base 12 may be provided. On a first end of the base 12 a flange 14 may be used to be received by one of the slots. A first slot 16 may be provided in the base 12 and adapted to receive the flange 14. As shown in FIG. 2, when the base 12 is rolled into a cylindrical shape and the flange 14 is received by the first slot 16, the resulting cylindrical shaped adjustable start collar 10 will have a predetermined diameter. In this embodiment that diameter will be smaller than the diameter of the adjustable start collar 10 when the flange 14 is received by the second slot 18. The diameter of the adjustable start collar 10 may be even larger when the flange 14 is received by the third slot 20. By positioning more than one slot (16, 18 or 20) in the base 12, each slot being capable of receiving the flange 14, one adjustable start collar 10 may be quickly and easily manipulated from a first diameter to a different diameter. In this way, one adjustable start collar 10 may be used for multiple different applications where different sized start collars would otherwise be needed.

Adjacent to the first end of the base 12 may be a second end of the base 12, which may include a plurality of tabs 22. These tabs 22 may extend from the base 12 to form a "saw tooth" arrangement. The number of tabs 22 and the spacing of these tabs 22 may be considered an design choice. The function of the tabs 22 is illustrated n FIG. 3. Some of the tabs 22 may be folded away from a central axis 24 of the adjustable start collar 10 when it is curved into a cylindrical shape. These folded tabs 26 may be systematically or randomly chosen so that the folded tabs 26 are interspaced with the insert tabs 28, which are not folded. The insert tabs 28 may be substantially uniform with the curve of the curved base 12.

Also shown in FIG. 3, the flange 14 is shown to be folded down toward the base 12 after being inserted into the first slot 16. This may be done to help secure the flange 14 in the first slot 16 (or any other slot), so that the desired diameter of the adjustable start collar 10 is maintained. A strip of duct tape (not shown) may be placed over the folded flange 14 to further secure it in place.

In FIGS. 4a-4c, the end views of three settings of the same adjustable start collar 10 are shown. In FIG. 4a, the flange 14 is positioned in the third slot 20, thus creating a larger diameter as noted by the dimension "D1". In FIG. 4b, the flange 14 is inserted in the second slot 18 resulting in a medium diameter, as noted by the dimension "D2". In FIG. 4c, the flange 14 is inserted into the first slot 16, thereby resulting in the smallest diameter of the adjustable start collar 10, the diameter designated by the dimension "D3". The third end 30 of the base 12, positioned opposite to the flange 14, may wrap around the inside of the cylinder created by rolling or curving the base 12 into a cylindrical shape. The location of the slots (16, 18 and 20) on the base 12 may determine the dimensions (D1, D2 and D3) of the cylindrical shape of the adjustable start collars 10. These dimensions (D1, D2 and D3) may coincide to the outside dimensions of existing start collars that do not adjust.

The result may be one adjustable start collar 10 that can copy the form and function of multiple non-adjustable start collars. The advantages include reduced need for inventory of the installer and the supplier. Also because the installer may be forming the final cylinder, either from a flat part (as in FIG. 1) or an arcuate or somewhat curved part, these parts may stack or nest together to take up less space in the shelf or in the installer's truck. This reduction in storage space may shave shipping costs as well as shelf space in a warehouse or in the vehicle of the installer. All of which may reduce costs. Even if the device is partially rolled into an arc or sold and shipped to the installer in a substantially flat orientation, it may be desirable to fold the flange 14 up and away from the base 12, as is illustrated in FIGS. 2, 4a, 4b and 4c. Folding the flange 14 up may only minimally reduce the storage capability but may significantly assist the process of obtaining the final shape of the adjustable start collar 10 to the desired diameter by the installer in the field.

In this embodiment of the invention, the adjustable start collar 10 has three slots (16, 18 and 20). This may be considered the preferred embodiment but it is understood that this is a design choice. The number of slots could be two slots or ten slots, or any other reasonable number of slots. Likewise, the spacing between the slots and relative positions of the slots from the flange 14 can be any dimensions deemed desirable to fit the needs of the installers to support any number of diameters of ducts.

Figure 5:
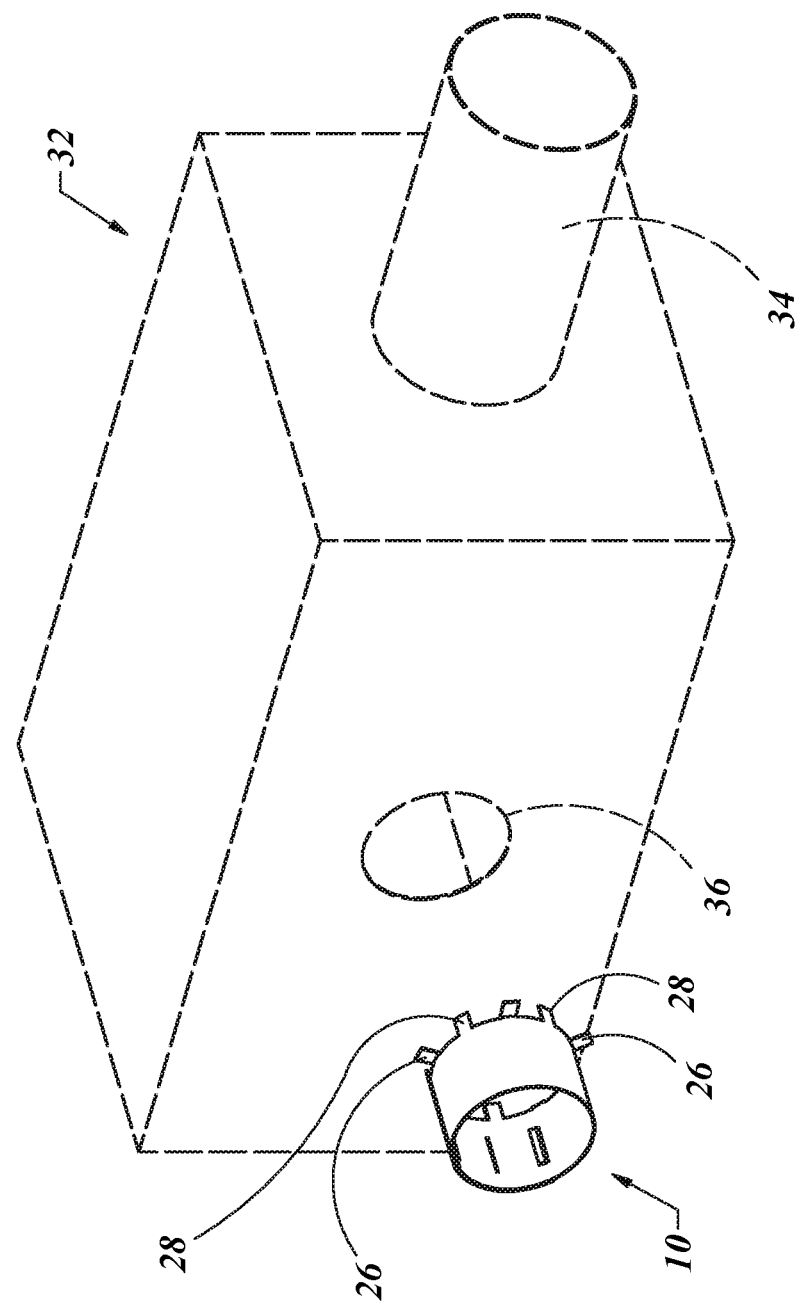
FIG. 5 is an isometric view of a plenum distribution box with a hole cut in one wall to provide a means of attachment to the adjustable start collar of FIG. 3.

The adjustable start collar 10 may be used to start an air duct line from a plenum distribution box 32. An additional air duct line 34 may be connected to the adjustable start collar 10 after the adjustable start collar 10 is secured to the plenum distribution box 32. This is partially illustrated in FIGS. 5 & 6. The installer may cut the appropriate diameter box hole 36 in the appropriate side of the plenum distribution box 32. The adjustable start collar 10 may then be inserted into the box hole 36 with the insert tabs 28 acting as guides on the inside of the box hole 36. The far side of the folded tabs 26 may define a support surface, which may act as a stop then the support surface contacts the outer surface of the plenum distribution box 32. This is shown in FIG. 6. The folded tabs 26 may be secured to the outside of the plenum distribution box by any combination of sheet metal screws, a sealing compound, duct tape or any other means known in the art of HVAC. After the adjustable start collar 10 is secured to the plenum distribution box 32, a new duct line 34 may be placed over the adjustable start collar 10 to start a new air duct line 34 (not shown) in the position and direction determined by the adjustable start collar 10.

The foregoing detailed description of the present invention is provided for purposes of illustration, and it is not intended to be exhaustive or to limit the invention to the particular embodiment shown. The embodiments may provide different capabilities and benefits, depending on the configuration used to implement key features of the invention.

What is claimed is:

1. An adjustable duct start collar, comprising:
a base including a flange positioned substantially centered on a first end of the base and a plurality of tabs on a second end of the base, the base constructed of a material of substantially uniform thickness; and
at least two slots aligned with the flange in the base, the first of the at least two slots positioned substantially parallel to a second of the at least two slots, each of the slots of the at least two slots being able to independently and entirely receive the flange, the flange being folded down toward the base while in one of the at least two slots, securing the base in a cylindrical shape of a first diameter and when the flange is entirely positioned in the second of the at least two slots and folded over, the curved base will form a cylindrical shape with a second diameter.

2. The adjustable duct start collar according to claim 1, wherein the first end of the base is adjacent to the second end of the base.

3. The adjustable duct start collar according to claim 1, wherein at least one of the plurality of tabs is folded to be substantially parallel to the second end of the base.

4. The adjustable start collar according to claim 1, wherein at least two of the plurality of tabs are folded away from a central axis of the cylindrical shape of the curved base, whereby an outer surface of the at least two of the plurality of tabs form a support surface.

5. The adjustable start collar according to claim 4, wherein the support surface supports the adjustable start collar onto a piece of ductwork.

6. The adjustable start collar according to claim 1, wherein at least two of the plurality of tabs remain substantially uniform with the curved base, thereby creating insert tabs, wherein the insert tabs support the adjustable start collar positioned in a hole placed in a piece of ductwork.

7. The adjustable start collar according to claim 1, wherein the adjustable start collar is manufactured from a pliable material.

8. The adjustable start collar according to claim 7, wherein the pliable material is galvanized sheet metal.

9. The adjustable start collar according to claim 8, wherein the sheet metal is a material between 0.012 and 0.018 inches thick.

10. The adjustable start collar according to claim 1, wherein a dimension of each of the at least two slots is between 0.005 and 0.120 inches greater than the dimension of the substantially uniform thickness of the base.

11. The adjustable start collar according to claim 1, wherein the flange is folded perpendicular to the base when the base is substantially flat.

12. The adjustable start collar according to claim 1, wherein the flange is folded back toward the base after being inserted into one of the at least two slots after the base is curved into the cylindrical shape.

* * * * *